US012630074B2

(12) United States Patent　　(10) Patent No.:　US 12,630,074 B2
Sung　　(45) Date of Patent:　May 19, 2026

(54) VEHICLE LAMP SYSTEM HAVING CONTROLLER FOR CHANGING BEAM PATTERNS THAT CONSUME A SAME POWER

(71) Applicant: HYUNDAI MOBIS CO., LTD., Seoul (KR)

(72) Inventor: Jun Young Sung, Suwon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 427 days.

(21) Appl. No.: 18/493,682

(22) Filed: Oct. 24, 2023

(65) Prior Publication Data

US 2024/0198888 A1　　Jun. 20, 2024

(30) Foreign Application Priority Data

Dec. 15, 2022　　(KR) ........................ 10-2022-0175443

(51) Int. Cl.
*B60Q 1/08*　　(2006.01)
*F21S 41/657*　　(2018.01)

(52) U.S. Cl.
CPC ............ *B60Q 1/085* (2013.01); *F21S 41/657* (2018.01); *B60Q 2300/112* (2013.01)

(58) Field of Classification Search
CPC . B60Q 1/085; B60Q 1/08; B60Q 1/06; B60Q 2300/112; F21S 41/657; F21S 41/60; F21S 41/65
USPC .................................. 362/465, 466, 404, 507
See application file for complete search history.

(56) References Cited

U.S. PATENT DOCUMENTS

| | | | | |
|---|---|---|---|---|
| 6,406,172 B1* | 6/2002 | Harbers | ................. | B60Q 1/085 |
| | | | | 362/544 |
| 7,201,501 B2* | 4/2007 | Chigusa | ................. | B60Q 1/085 |
| | | | | 362/465 |
| 9,041,808 B2* | 5/2015 | Seki | ........................ | B60Q 1/085 |
| | | | | 348/148 |
| 9,423,092 B1* | 8/2016 | Deyaf | ..................... | B60Q 1/085 |
| 9,494,288 B2* | 11/2016 | Kobayashi | ............ | F21S 41/657 |
| 9,758,087 B2* | 9/2017 | Albou | ..................... | B60Q 1/085 |
| 9,809,152 B2* | 11/2017 | Remillard | .............. | B60Q 1/085 |
| 11,092,303 B2* | 8/2021 | Park | ........................ | B60Q 1/085 |
| 2002/0003473 A1* | 1/2002 | Makita | .................. | B60Q 1/085 |
| | | | | 340/436 |
| 2007/0253597 A1* | 11/2007 | Utida | ..................... | B60Q 1/085 |
| | | | | 382/104 |
| 2012/0271511 A1* | 10/2012 | Dierks | .................. | B60Q 1/143 |
| | | | | 701/36 |

(Continued)

FOREIGN PATENT DOCUMENTS

KR　　2017-0078070　　　7/2017

OTHER PUBLICATIONS

English Language Abstract of KR 2017-0078070 published Jul. 7, 2017.

*Primary Examiner* — Ismael Negron
(74) *Attorney, Agent, or Firm* — DLA PIPER LLP US

(57) ABSTRACT

A lamp system includes a lamp unit installed in front of the vehicle to radiate a beam toward the front, a sensor unit sensing a driving state or driving environment information of the vehicle, and a controller controlling the lamp unit to change a beam pattern radiated by the lamp unit based on the information sensed by the sensor unit, and controlling beam patterns before and after the change to consume the same power.

9 Claims, 6 Drawing Sheets

(56) References Cited

U.S. PATENT DOCUMENTS

| | | | |
|---|---|---|---|
| 2018/0031200 A1* | 2/2018 | Park | F21S 41/141 |
| 2024/0084992 A1* | 3/2024 | Drezet | F21S 41/657 |

* cited by examiner

VEHICLE LAMP SYSTEM HAVING CONTROLLER FOR CHANGING BEAM PATTERNS THAT CONSUME A SAME POWER

CROSS-REFERENCE TO RELATED APPLICATIONS

This application claims priority under 35 U.S.C. § 119 to Korean Patent Application No. 10-2022-0175443, filed on Dec. 15, 2022, in the Korean Intellectual Property Office, the disclosure of which is incorporated herein by reference in its entirety.

TECHNICAL FIELD

The following disclosure relates to a lamp system for a vehicle, and in particular, to a lamp system for a vehicle that may secure visibility at a long distance with the same power consumption.

BACKGROUND

In accordance with the trend of vehicle electrification, sensors for driving convenience have continuously evolved, and the paradigm of driving is changing from the drivers' eyes to sensors. Accordingly, lamps also need to assist driving through a pattern change that helps sensor recognition. In particular, lamps play a very important role for a camera to recognize emergency situations at night. Considering that a stopping distance increases exponentially as a vehicle speed doubles, the need for rapid recognition of emergency situations through securing long-distance visibility during high-speed driving has become increasingly important.

As a technology for changing a beam radiation pattern of the related art lamp, there is a technology for varying a low beam pattern called an advanced front lighting system (AFS). However, since the commercialization of adaptive driving beam (ADB), a high beam usage rate has rapidly increased and the effectiveness of the low beam-related conventional technology has become insignificant. The ADB, which is the related art, is a technology for partially blocking glare from a vehicle in front by partially turning off lights or controlling instruments, but is merely a technology for controlling a simple fixed high beam pattern in a general situation without a vehicle.

RELATED ART DOCUMENT

Patent Document

Korean Application Publication No. 10-2017-0078070 ("Vehicle Lamp and Method for Controlling the Vehicle, published on Jul. 7, 2017)

SUMMARY

An exemplary embodiment of the present invention is directed to providing a lamp system for a vehicle capable of securing visibility at a long distance with the same power consumption according to a driving state of a vehicle to help a driver or a sensor installed in the vehicle to recognize a surrounding environment.

In one general aspect, a lamp system for a vehicle includes: a lamp unit installed in front of the vehicle to radiate a beam toward the front; a sensor unit sensing A driving state or driving environment information of the vehicle; and a controller controlling the lamp unit to change a beam pattern radiated by the lamp unit based on the information sensed by the sensor unit, and controlling changed beam patterns to consume the same power.

A region toward which the beam is radiated by the lamp unit may be divided into a first region at a predetermined horizontal angle based on the front of the vehicle and a second region other than the first region, the sensor unit may sense or receive a speed of the vehicle, and the controller may calculate a stopping distance of the vehicle by receiving vehicle speed information from the sensor unit, and when the stopping distance of the vehicle increases, the controller may control the lamp unit to increase an amount of light in the first region and decrease an amount of light in the second region to compensate for power consumption increased in the first region, and when the stopping distance of the vehicle decreases, the controller may control the lamp unit to decrease the amount of light in the first region and increase the amount of light in the second region to compensate for power consumption decreased in the first region.

When the stopping distance of the vehicle increases, the controller may control the lamp unit to narrow the angle of the first region, and when the stopping distance of the vehicle decreases, the controller may control the lamp unit to widen the angle of the first region.

The stopping distance of the vehicle and a distance from the front of the vehicle to a front end of the first region may be proportional to each other.

The amount of light in the first region may be greater than or equal to the amount of light in the second region.

The controller may receive information on a road where the vehicle is located and a surrounding road from the outside and control the lamp unit to adjust a direction of the first region according to a direction of the road on which the vehicle is traveling.

When the direction of the road on which the vehicle is traveling is changed, the controller may control the lamp unit so that the first region is biased to a direction in which the road is changed at a reference distance before the direction of the road is changed.

The reference distance may be linked to the stopping distance calculated by the controller.

A region to which the beam is radiated by the lamp unit may be divided into a first region at a predetermined horizontal angle based on the front of the vehicle and a second region other than the first region, the sensor unit may sense or receive a speed of the vehicle, and when the speed of the vehicle increases, the controller may control the lamp unit to increase an amount of light in the first region and decrease an amount of light in the second region to compensate for power consumption increased in the first region, and when the speed of the vehicle decreases, the controller may control the lamp unit to decrease the amount of light in the first region and increase the amount of light in the second region to compensate for power consumption decreased in the first region.

Other features and aspects will be apparent from the following detailed description, the drawings, and the claims.

DETAILED DESCRIPTION OF EXEMPLARY EMBODIMENTS

Figure 1:
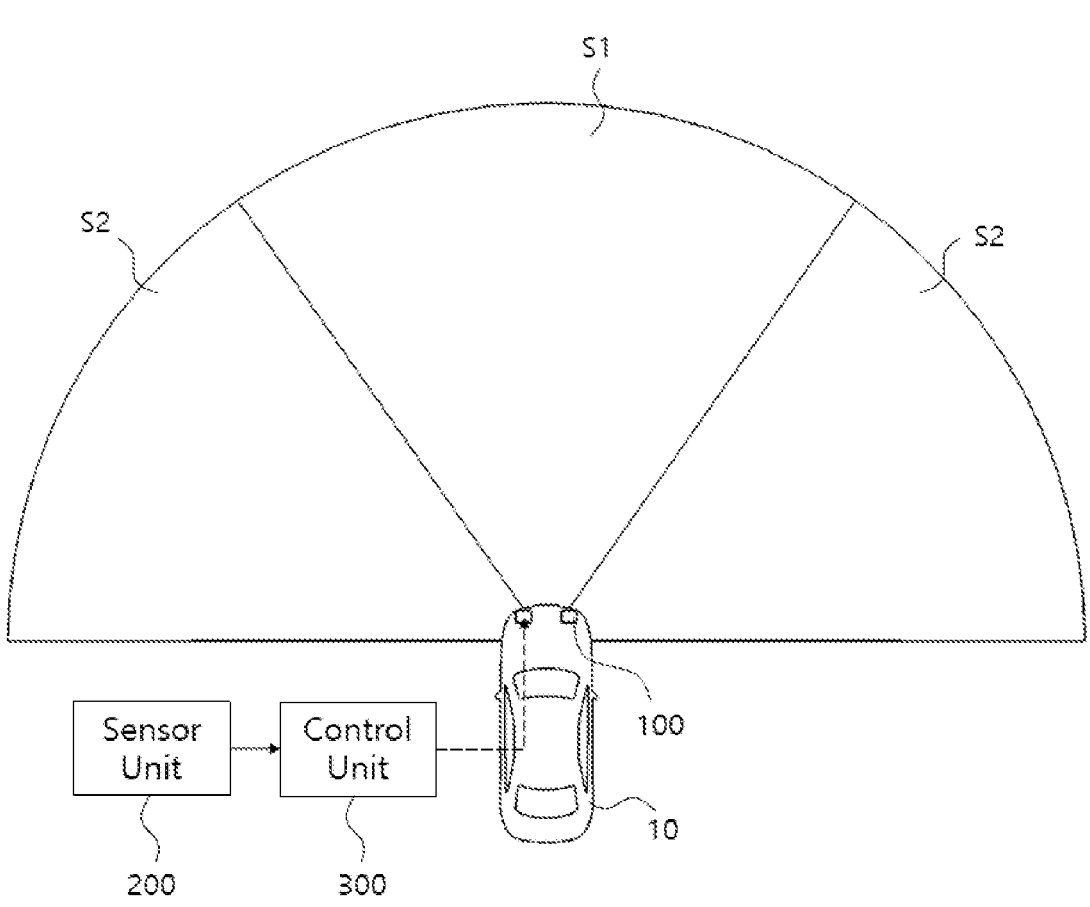
FIG. 1 is a schematic diagram of a lamp system for a vehicle according to a first exemplary embodiment of the present invention.

The advantages, features and aspects of the present invention will become apparent from the following description of the exemplary embodiments with reference to the accompanying drawings, which is set forth hereinafter. The specific structures and functional description will be only provided for the purpose of illustration of the exemplary embodiments according to the concept of the invention, so that the exemplary embodiments of the invention may be embodied in many different forms and should not be construed as being limited to the exemplary embodiments set forth herein. The exemplary embodiments according to the concept of the invention may be changed to diverse forms, so that the invention will be described and illustrated with reference to specific exemplary embodiments. However, it should be understood that the exemplary embodiments according to the concept of the invention is not intended to limit to the specific exemplary embodiments disclosed, but they include all the modifications, equivalences, and substitutions, which are included in the scope and spirit of the invention. It will be understood that although the terms "first," and/or "second," etc. may be used herein to describe various elements, these elements should not be limited by these terms. These terms are only used to distinguish one element from another element. Thus, a first element discussed below could be termed a second element and vice versa without departing from the nature of the present invention. It will be understood that when an element is referred to as being "connected or coupled" to another element, it may be directly connected or coupled to the other element or intervening elements may be present therebetween. In contrast, when an element is referred to as being "directly connected or coupled" to another element, there are no intervening elements present. Other expressions, such as "between" and "directly between," or "adjacent" or "directly adjacent" should be understood in a similar manner. The terminology used herein is for the purpose of describing particular exemplary embodiments only and is not intended to limit the invention. As used herein, the singular forms "a," "an" and "the" are intended to include the plural forms as well, unless the context clearly indicates otherwise. It will be further understood that the terms "comprises" and/or "comprising." or "includes" and/or "including," when used in this specification, specify the presence of stated features, numbers, steps, operations, components, parts, or combinations thereof but do not preclude the presence or addition of one or more other features, numbers, steps, operations, components, parts, or combinations thereof, but do not preclude the presence or addition of one or more other stated features, numbers, steps, operations, components, parts, or combinations thereof but do not preclude the presence or addition of one or more other features, numbers, steps, operations, components, parts, or combinations thereof, Unless otherwise defined, the meaning of all terms including technical and scientific terms used herein is the same as that commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein. The exemplary embodiment will now be described with reference to the accompanying drawings, in which exemplary embodiments of the present invention are shown. The same reference numerals indicated in the drawings refer to similar elements throughout.

First Exemplary Embodiment

Figure 2:
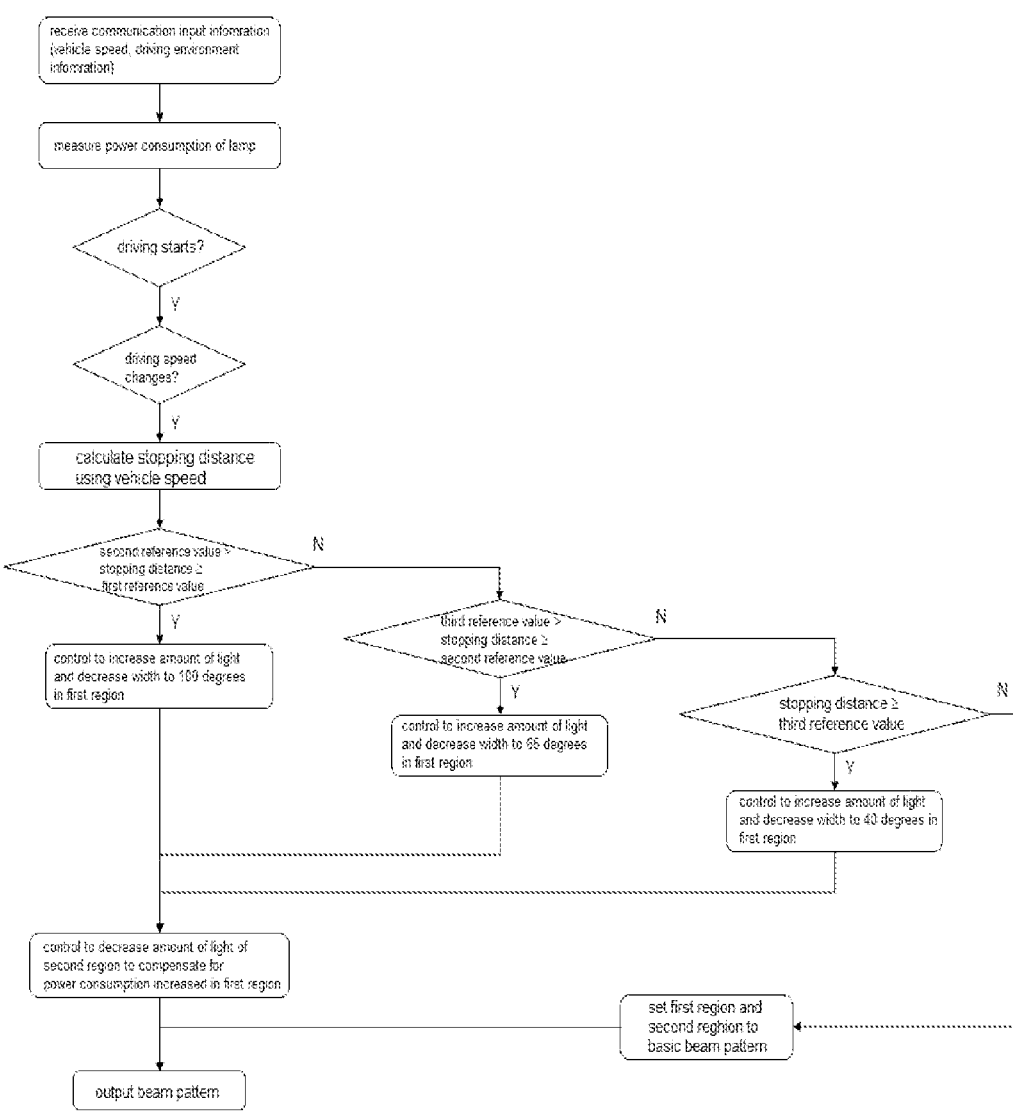
FIG. 2 is a flowchart of a lamp system for a vehicle according to the first exemplary embodiment of the present invention.

FIG. 1 is a schematic diagram of a lamp system for a vehicle according to a first exemplary embodiment of the present invention, and FIG. 2 is a flowchart of a lamp system for a vehicle according to a first exemplary embodiment of the present invention.

As shown in FIG. 1, the lamp system for a vehicle according to the first exemplary embodiment of the present invention includes a lamp unit 100, a sensor unit 200 and a controller 300.

The lamp unit 100 is installed in front of a vehicle 10 and radiates a beam toward the front. In the present exemplary embodiment, the lamp unit 100 is described as radiating a high beam, but the present invention does not limit the beam radiated by the lamp unit 100 to the high beam, and in an exemplary embodiment, the lamp unit 100 may radiate a low beam, which is a general beam.

A headlight of general vehicles is a low beam, and the lamp itself is usually adjusted to be parallel to a height of the vehicle so as not to obstruct the view of other drivers, or tilted downwardly to illuminate a road surface when the height of the vehicle is high. A general low beam illuminates 40 m in front of the vehicle. In a general urban city, low beams are useful because they do not obstruct the view of other drivers, but since the low beams illuminate a relatively short distance from the front of the vehicle, it may be difficult to secure the visibility of the driver of the vehicle or sensors attached to the vehicle. Therefore, recently, technologies for recognizing objects around the vehicle under specific conditions and automatically turning on high beams within a line that does not obstruct the view of other vehicles have been introduced.

The sensor unit 200 serves to sense a driving state of the vehicle or driving environment information. The sensor unit 200 may directly receive a driving state or driving environment information of the vehicle from the outside, or may sense the driving state or driving environment of the vehicle using a sensor thereof. In the present exemplary embodiment, the driving state of the vehicle may be a speed of the vehicle, and the sensor unit 200 may receive vehicle speed information directly from the outside, that is, from a driving system or speedometer of the vehicle, or may sense the speed of the vehicle by itself using a speed sensor.

As shown in FIG. 2, the controller 300 may calculate a stopping distance of the vehicle based on the information sensed by the sensor unit 200, that is, the speed of the vehicle in the present exemplary embodiment, and change a beam pattern radiated from the lamp unit 100 according to the calculated stopping distance.

The stopping distance of the vehicle calculated by the controller 300 may refer to a distance required for the driver (a vehicle control device in the case of an autonomous vehicle) to completely stop the vehicle, and may be expressed as the sum of an idle running distance and a braking distance.

The idle running distance refers to a distance by which a vehicle travels while the driver (or a control device of the vehicle) starts an action to step on the brake upon spotting an object, and the braking distance refers to a distance from when a brake pedal is stepped on to when the actual braking force works. The stopping distance may be expressed as follows. Each of the idle running distance and the braking distance may have different values depending on the vehicle. For example, Hyundai Motor's Genesis Coupe has an average braking distance of 41.65 m on dry and wet roads while driving at 100 km/h, and Hyundai Avante's average braking distance on dry and wet roads is 42.05 m, and these values are different from each other. That is, the controller 300 may calculate the stopping distance based on different references according to the type of the current vehicle. The idle running distance may not be quantifiable because it is an element that involves the driver's judgment process. In contrast, in the case of autonomous vehicles, a distance itself by which the autonomous vehicle travels until the sensor recognizes a situation ahead and operates the brake may be calculated. Therefore, if the vehicle is an autonomous vehicle, the controller 300 may calculate the stopping distance using the idle running distance and braking distance of each vehicle and the speed of the vehicle input from the sensor unit 200, and if the vehicle is not an autonomous vehicle, the controller 300 may calculate the stopping distance using a formula of an approximated idle running distance, the braking distance for each vehicle, and the speed of the vehicle input from the sensor unit 200, or may calculate the stopping distance using only the braking distance for each vehicle. As an example of a formula for obtaining the stopping distance using the idle running distance and the braking distance, there may be the following formula:

$$\text{Stopping distance}=\text{breaking distance}+\text{idle running distance}=aV^2+bV$$

In the above formula, V is the speed of the vehicle, and the coefficient a of the braking distance and the coefficient b of the idle running distance may vary depending on the vehicle. The coefficient b of the term for obtaining the idle running distance may be approximated and a specific value may be used.

A beam pattern radiated from the lamp unit 100 according to the stopping distance of the vehicle in the controller 300 will be described in detail.

First, the region in which the beam is radiated by the lamp unit 100 may be divided into a first region S1 having a predetermined horizontal angle with respect to a front direction of the vehicle and a second region S2 that is the other region. The first region may be referred to as a hot zone, and the second region S2 may be referred to as a spread zone. The first region S1 in which the beam is radiated from the lamp unit 100 is a portion in which it is relatively important to recognize vehicles, pedestrians, and objects, and the second region S2 is a portion in which it is relatively less important to recognize vehicles, pedestrians, and objects. In particular, the first region S1 may be referred to as a portion closest to the driver's field of view. When the speed of the vehicle increases, the first region S1, which is the driver's field of view, narrows. Since the stopping distance of the vehicle increases when the speed of the vehicle increases, the driver or the sensor needs to recognize a longer distance in the first region S1. In summary, as the speed of the vehicle increases, the visibility in the first region S1 needs to be enhanced.

When the stopping distance of the vehicle is greater than or equal to a first reference value and less than a second reference value, the controller 300 may increase the amount of light in the first region S1 to enhance visibility in the first region S1 so that the driver or the sensor may easily recognize a long distance from the first region S1. This case is referred to as a first case. In addition, when the stopping distance of the vehicle is greater than or equal to the second reference value and less than a third reference value, the controller 300 may increase the amount of light in the first region S1 to be more than that of the first case to enhance visibility in the first region S1, so that the driver or the sensor may easily recognize a longer distance from the first region S1. This case is referred to as a second case. Lastly, when the stopping distance of the vehicle is equal to or greater than the third reference value, the controller 300 may increase the amount of light in the first region S1 to be more than that of the second case to further enhance visibility in the first region S1 so that the driver or the sensor may easily recognize a longer distance from the first region S1. This case is referred to as a third case. In FIG. 2, the amount of light in the first region S1 may be controlled using the first, second, and third reference values, but the present invention is not limited thereto, and a greater number of reference values may be used according to the needs of the driver or a system. When the case in which the stopping distance is less than the first reference value is a basic case, the amount of light in the first region S1 in the basic case may be less than those of the first case, the second case, and the third case. The amounts of light in the first case, the second case, and the third case may be equal to each other or the amount of light in the first region S1 may gradually increase in a direction from the first case to the second case and the third case.

As the amount of light increases in the first region S1 by controlling the lamp unit 100 by the controller 300, a distance by which the beam is directed to the front of the vehicle 10, that is, a distance of the first region S1 may increase, and in this case, a distance from the vehicle in the first region S1 to a front end may be proportional to a stopping distance according to the speed of the current vehicle. For example, it is assumed that the current vehicle is the Genesis Coupe of Hyundai Motors described above and is traveling at 100 km/h, and a braking distance is 41.65 m and a stopping distance including an idle running distance is 50 m. In this case, the controller 300 may control the lamp unit 100 so that the first region S1 illuminates 20 times the stopping distance, that is, 1 km. Here, 1 km refers to a distance from the front of the vehicle 10 to the front end of the first region S1. Alternatively, it is assumed that a vehicle of the same type is traveling at 80 km/h and the stopping distance is 40 m. In this case, the controller may control the lamp unit 100 so that the first region S1 illuminates 20 times the stopping distance, that is, 800 m. Controlling the lamp unit 100 by the controller 300 to increase the amount of light in the first region S1 may be implemented by increasing the amount of current flowing through a lamp radiating the first region S1, among lamps included in the lamp unit 100 or the like, and the opposite example is also possible.

When the amount of light in the first region S1 is increased in the above manner, power consumed in the entire lamp unit 100 may increase, which may not be efficient in terms of power consumption. In order to solve this problem, the controller 300 may control the lamp unit 100 to increase the amount of light in the first region S1 and lower the amount of light in the second region S2 at the same time, so that power consumption additionally required to increase the amount of light in the first region S1 may be compensated in the second region S2, and thus, the same power as that before the amounts of light in the first region S1 and the second region S2 are adjusted may be consumed in the lamp unit 100. This process may be performed according to the change in power consumption of the first region S1 as the process of increasing the amount of light in the first region S1 is determined based on the stopping distance of the vehicle. Reducing the amount of light in the second region S2 may be implemented by reducing the amount of current flowing through the lamp side radiating the second region S2, among the lamps included in the lamp unit 100, and the like, and of course, the opposite example is also possible.

As shown in FIGS. 1 and 2, the controller 300 not only simply adjusts the amounts of light in the first region S1 and the second region S2 according to the speed of the vehicle, but also adjusts the range of the first region S1 and the range of the second region S2. As described above, when the speed of the vehicle increases, the driver or the sensor needs to recognize vehicles, pedestrians, and objects at a distance greater than the front of the vehicle. To this end, as the stopping distance of the vehicle calculated by the controller 300 increases, not only does the amount of light in the first region S1 simply increase, but the driver or the sensor of the vehicle may also easily recognize a distance greater than the front of the vehicle when the first region S1 narrows. Therefore, as the stopping distance increases, the controller 300 controls the lamp unit 100 to increase the amount of light while decreasing the angle of the first region S1 and controls the lamp unit 100 to decrease the amount of light of the second region S2, and conversely, as the stopping distance of the vehicle decreases, the controller 300 controls the lamp unit 100 to increase the angle of the first region S1 and decrease the amount of light and controls the lamp unit 100 to increase the amount of light in the second region S2. However, the controller 300 may control the lamp unit 100 such that the amount of light in the first region S1 is not less than the amount of light in the second region S2. This is because the first region S1 is a region in which the situation should be recognized more importantly than the second region S2 no matter how much the stopping distance of the vehicle decreases.

Figure 3A:
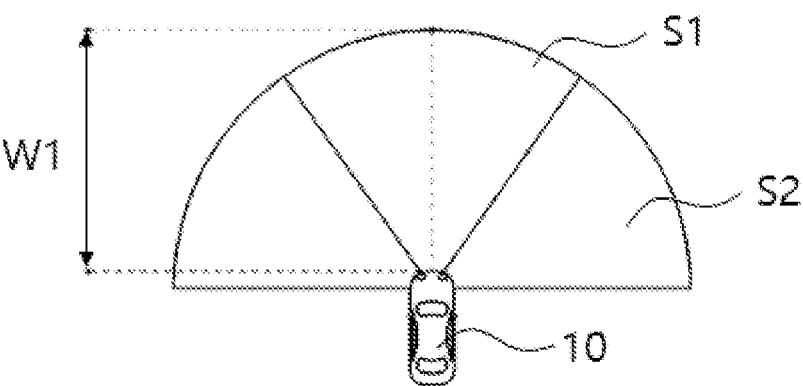
FIGS. 3A-3C are schematic views of adjusting the amount and range of light in a first region according to a stopping distance of a vehicle of the lamp system for a vehicle according to the first exemplary embodiment of the present invention.
Figure 3B:
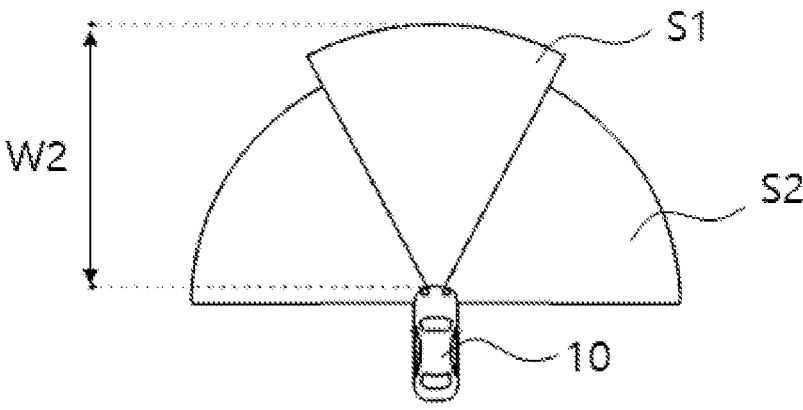
Figure 3C:
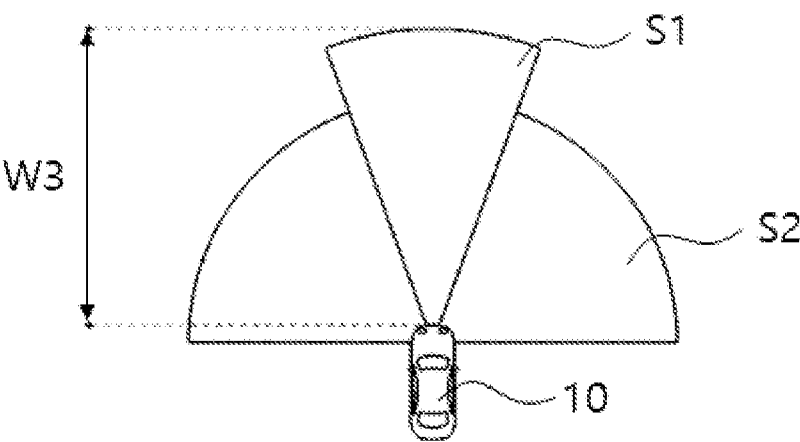

FIGS. 3a-3c are schematic diagrams in which the amount of light and range of the first region are adjusted according to a stopping distance of the lamp system for a vehicle according to the first exemplary embodiment of the present invention. In FIGS. 3a-3c, a distance W1 of the first region S1 in the first case (FIG. 3A) is shorter than a distance W2 of the first region S1 in the second case (FIG. 3B), and a distance W3 of the first region S1 in the third case (FIG. 30) is shorter than W2.

As described above, in the lamp system for a vehicle according to the first exemplary embodiment of the present invention, the controller 300 calculates the stopping distance of the vehicle and adjusts the amount of light and width of the first region S1 accordingly. However, according to the present invention, a numerical value as a reference for the controller 300 to adjust the amount of light and the width of the first region S1 is not limited to the stopping distance, and in an embodiment, the controller 300 may adjust the amount of light and the width of the first region S1 according to a speed of the vehicle 10 recognized through the sensor unit 200.

As described above, the lamp system for a vehicle according to the first exemplary embodiment of the present invention may basically operate in a dark environment and may not operate in a bright environment, such as in the daytime. To this end, the lamp system for a vehicle according to the first exemplary embodiment of the present invention may include a separate illuminance sensor, and when an illuminance value sensed by the illuminance sensor is greater than or equal to a reference value, the lamp system for a vehicle according to the present exemplary embodiment may not be operated, and when the illuminance value sensed by the illuminance sensor is less than the reference value, the lamp system for a vehicle according to the present exemplary embodiment may be operated.

Second Exemplary Embodiment

Figure 4A:
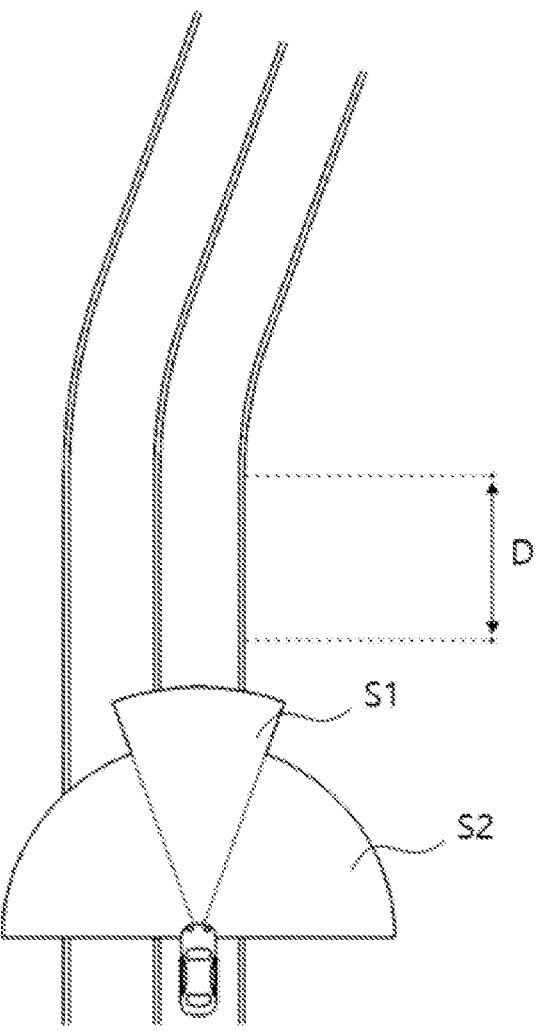
FIGS. 4A-4B are schematic diagrams of a lamp system for a vehicle according to a second exemplary embodiment of the present invention.
Figure 4B:
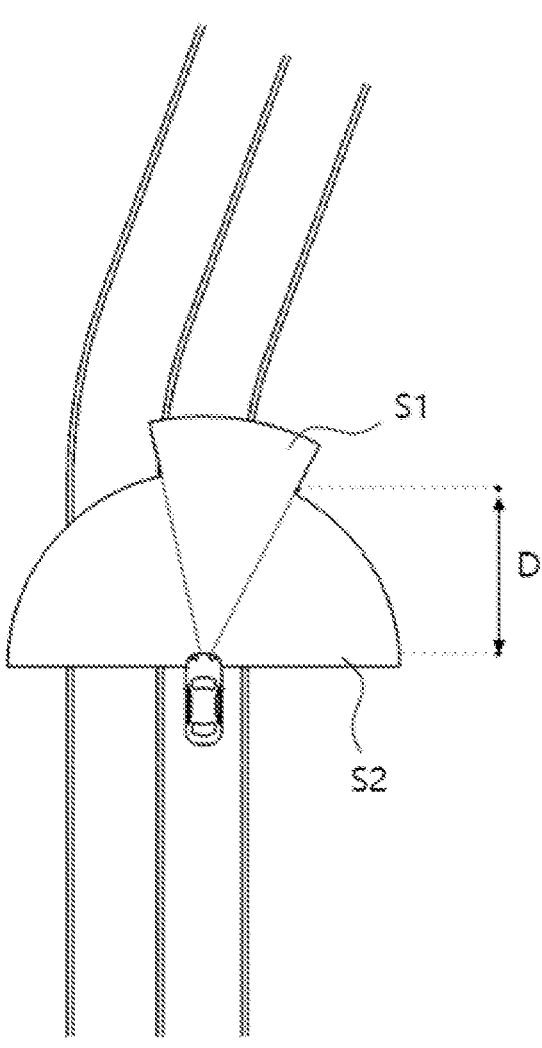

FIGS. 4A-4B are schematic diagrams of a lamp system for a vehicle according to a second exemplary embodiment of the present invention.

As shown in FIGS. 4A and 4B, the lamp system for a vehicle according to the second exemplary embodiment of the present invention moves the first region S1 according to a direction of a road on which the vehicle is traveling in the first exemplary embodiment described above. This is because, when the road on which the vehicle is traveling is curved, visibility in front of the vehicle is enhanced only when the first region S1 moves in the direction of the road.

To this end, the controller 300 receives information on the road where the vehicle is located and a surrounding road from an external source. At this time, the external source may be a device, such as a navigation system included in a higher system of the vehicle. When the road on which the vehicle is traveling is changed to a left-curved shape, the controller 300 controls the lamp unit 100 so that the direction of the first region S1 is moved to the direction in which the road is curved before a reference distance for the direction of the road on which the vehicle is traveling is changed. At this time, the reference distance may be linked with a stopping distance D calculated by the controller 300 of the lamp system for a vehicle according to the first exemplary embodiment of the present invention described above. For example, in the present exemplary embodiment, the reference distance may be set to 7 times the stopping distance. Assuming that the stopping distance of the vehicle is 50 m, the reference distance may be 350 m, and when the vehicle 10 passes through 350 m before from a point at which the road is curved, the controller 300 may control the lamp unit 100 to move the first region S1 to the direction in which the road is curved.

According to the lamp system for a vehicle according to various exemplary embodiments as described above, the controller adjusts the amount of light and angle of each of the first region and the second region, which are beam regions radiated from the lamp unit, according to a driving environment of the vehicle, in particular, according to the stopping distance of the vehicle, so that the sensor may easily collect surrounding information of the vehicle.

In addition, in the present invention, since the amount of light in the first region is determined according to the stopping distance, which is a different factor for each vehicle, visibility in front of the vehicle may be efficiently enhanced.

In addition, according to the present invention, when the controller adjusts the amount of light in each of the first region and the second region, power consumption is compensated by adjusting the amount of light in the second region by power consumption increased or decreased while adjusting the amount of light in the first region, and thus, visibility of the driver or the sensor may be enhanced with the same power consumption.

In addition, according to the present invention, the controller adjusts the direction of the first region, which is a portion in which a beam is radiated to the front of the vehicle according to the direction of the road on which the vehicle is traveling, so that the driver or the sensor may easily recognize information on road conditions and surrounding objects.

In addition, according to the present invention, the controller adjusts the direction of the first region before the reference distance in which the direction of the road is changed according to the direction of the road on which the vehicle is traveling and the speed of the vehicle, and in this case, since the reference distance is changed according to the stopping distance of the vehicle, the driver or the sensor may more easily collect information on road conditions and surrounding objects.

In addition, according to the present invention, since the beam pattern radiated from the lamp unit is implemented by integrating only sensor information without a separate high beam boost optical system, the lamp system for a vehicle according to the present invention may be implemented more economically.

Although the preferred exemplary embodiments of the present invention have been described above, the exemplary embodiments disclosed in the present invention are not intended to limit the technical spirit of the present invention, but are only for explanation. Therefore, the technical spirit of the present invention includes not only each disclosed exemplary embodiment, but also a combination of the disclosed exemplary embodiments, and furthermore, the scope of the technical spirit of the present invention is not limited by these exemplary embodiments. In addition, those skilled in the art to which the present invention pertains may make many changes and modifications to the present invention without departing from the spirit and scope of the appended claims, and all such appropriate changes and modifications, as equivalents, are to be regarded as falling within the scope of the present invention.

DETAILED DESCRIPTION OF MAIN ELEMENTS

10: vehicle
100: lamp unit
200: sensor unit
300: controller
D: stopping distance
S1: first region
S2: second region

What is claimed is:

1. A lamp system for a vehicle, the lamp system comprising:
a lamp unit configured to be installed in front of the vehicle to radiate a beam toward the front;
a sensor unit configured to sense a driving state or driving environment information of the vehicle; and
a controller configured to control the lamp unit to change a beam pattern radiated by the lamp unit based on the information sensed by the sensor unit, and control beam patterns before and after the change to consume a same power.

2. The lamp system of claim 1, wherein:
a region to which the beam is radiated by the lamp unit is divided into a first region at a predetermined horizontal angle based on the front of the vehicle and a second region other than the first region,
the sensor unit is configured to sense or receive a speed of the vehicle,
the controller is configured to control the lamp unit, when the speed of the vehicle increases, to increase an amount of light in the first region and decrease an amount of light in the second region to compensate for power consumption increased in the first region, and
the controller is configured to control the lamp unit, when the speed of the vehicle decreases, to decrease the amount of light in the first region and increase the amount of light in the second region to compensate for power consumption decreased in the first region.

3. The lamp system of claim 1, wherein:
a region to which the beam is radiated by the lamp unit is divided into a first region at a predetermined horizontal angle based on the front of the vehicle and a second region other than the first region,
the sensor unit is configured to sense or receive a speed of the vehicle,
the controller is configured to calculate a stopping distance of the vehicle by receiving vehicle speed information from the sensor unit,
the controller is configured to control the lamp unit, when the stopping distance of the vehicle increases, to increase an amount of light in the first region and decrease an amount of light in the second region to compensate for power consumption increased in the first region, and
the controller is configured to control the lamp unit, when the stopping distance of the vehicle decreases, to decrease the amount of light in the first region and increase the amount of light in the second region to compensate for power consumption decreased in the first region.

4. The lamp system of claim 3, wherein,
the controller is configured to control the lamp unit to narrow the angle of the first region when the stopping distance of the vehicle increases, and
the controller is configured to control the lamp unit to widen the angle of the first region when the stopping distance of the vehicle decreases.

5. The lamp system of claim 3, wherein the stopping distance of the vehicle and a distance from the front of the vehicle to a front end of the first region are proportional to each other.

6. The lamp system of claim 3, wherein an amount of light in the first region is greater than or equal to an amount of light in the second region.

7. The lamp system of claim 3, wherein the controller is configured to receive information on a road where the vehicle is located and a surrounding road and control the lamp unit to adjust a direction of the first region according to a direction of the road on which the vehicle is traveling.

8. The lamp system of claim 7, wherein, when the direction of the road on which the vehicle is traveling is changed, the controller is configured to control the lamp unit so that the first region is biased to a direction in which the road is changed at a reference distance before the direction of the road is changed.

9. The lamp system of claim 8, wherein the reference distance is linked to the stopping distance calculated by the controller.

* * * * *